United States Patent
Periasamy et al.

(10) Patent No.: US 7,316,478 B2
(45) Date of Patent: Jan. 8, 2008

(54) DYNAMIC MULTIFOCAL SPECTACLE FRAME

(75) Inventors: Parikumar Periasamy, 39-D Bypass Road, Dharmapuri (IN) 636701; Sadagopan Karthiekeyan Arcot, Chennai (IN)

(73) Assignee: Parikumar Periasamy (IN)

( * ) Notice: Subject to any disclaimer, the term of this patent is extended or adjusted under 35 U.S.C. 154(b) by 0 days.

(21) Appl. No.: 11/694,632

(22) Filed: Mar. 30, 2007

(65) Prior Publication Data

US 2007/0171360 A1 Jul. 26, 2007

Related U.S. Application Data

(63) Continuation-in-part of application No. 11/166,706, filed on Jun. 23, 2005, now abandoned.

(30) Foreign Application Priority Data

Jul. 15, 2004 (IN) .......................... 687/CHE/2004

(51) Int. Cl.
*G02C 7/08* (2006.01)
(52) U.S. Cl. .............................. 351/57; 351/41; 351/59
(58) Field of Classification Search .................. 351/41, 351/47–48, 54, 55, 57–59, 61
See application file for complete search history.

(56) References Cited

U.S. PATENT DOCUMENTS

| 1,206,457 | A | | 11/1916 | Mills |
| 5,598,232 | A | | 1/1997 | Pronesti |
| 5,923,396 | A | * | 7/1999 | Ulvio .......................... 351/57 |
| 6,264,325 | B1 | | 7/2001 | Peressini et al. |

* cited by examiner

*Primary Examiner*—Huy Mai
(74) *Attorney, Agent, or Firm*—Howison & Arnott, L.L.P.

(57) ABSTRACT

This invention pertains to an attachment for bifocal eyeglasses which is a dynamic frame fitted with the lens for intermediate vision which will lie in front of the middle one third of the bifocal lens during computer use providing three zones of vision at a time without changing the head position or changing to a separate computer eye glass. This attachment along with the bifocal eye glass enables the optical centers of the distant vision and intermediate vision lens to overlap with each other falling on the visual axis, coinciding with the pupillary center of the eye at the primary head position overcoming strain, distortions and aberrations. This dynamic frame is locked at the side of the main frame with the help of press locks when 'not in use'. This invention makes long hours of computer work comfortable and helps to overcome computer vision syndrome.

20 Claims, 4 Drawing Sheets

DYNAMIC MULTIFOCAL SPECTACLE FRAME

CROSS-REFERENCE TO RELATED APPLICATIONS

This application is a Continuation in part of pending U.S. patent application Ser. No. 11/166,706, entitled DYNAMIC MULTIFOCAL SPECTACLE FRAME, filed on Jun. 23, 2005, which is incorporated herein by reference.

TECHNICAL FIELD

This invention pertains to an attachment for bifocal eyeglasses which is a dynamic frame fitted with the lens for intermediate vision which will lie in front of the middle one third of the bifocal lens during computer use providing three zones of vision at a time without changing the head position or changing to a separate computer eye glass.

BACKGROUND

Spectacle frames used by people above 40 years of age are provided with 2 types of lenses which are meant to give clear distant vision (>100 cms) and near vision (33-50 cms). These bifocal glasses are in use for many years.

Along with this as already known, a group of people in few occupations especially computer users need an extra lens to enable them to clearly visualize the monitor which lies at the intermediate zone (50-100 cms).

As already known in the prior art, this third power is provided in a separate spectacle frame or is incorporated into the regular unifocal or bifocal spectacle frame replacing either one or both of the two powers providing only one or two zones of vision at a time. Particularly, bifocal glass wearers using computers either manage with the regular bifocal glasses putting up with the problems as mentioned below or carry separate computer eye glasses with the lens for intermediate vision, which is annoying. This requires repeated glass changing which is a nuisance.

The problems with the existing multifocal spectacle frames during computer usage are as follows 1) Inability to clearly visualize the computer monitor, embroidery machine etc. at a comfortable working distance.
2) To see the computer monitor people using only bifocal spectacles tend to acquire a peculiar neck position by lifting their chin up while trying to visualize the monitor through the near vision lens, which causes strain to the eyes, neck and the back resulting in chronic medical and surgical problems like back pain, headache, neck pain etc. which comprises the computer vision syndrome (CVS) in the ophthalmic terminology.
3) The strain reduces work efficiency and hampers long hours of working which is inevitable in the present pattern of jobs.

The already existing multifocal lenses like progressive lenses in a single frame according to prior art have a series of compromises like distortions and aberrations. These problems are occurring because the optical centers of distant and intermediate vision lenses do not overlap with each other and coincide with the pupillary center of the eye. There are peripheral vision distortions and aberrations due to the astigmatic curves. There is only a narrow central corridor of optimum vision which is not convenient for reading. This is not only expensive but also needs expertise for fitting. These glasses also pose a problem and do not give relief when the user does not need three zones of vision at any particular moment.

In the prior art mobile frames were used only for bifocals or monofocals or make up glasses. None of the mobile frames serve as trifocals in the prior art, and none of them were suitable or designed for computer use.

In these respects, this invention overcomes each of the above mentioned disadvantages of designs of the prior art as a computer eye glass. It is also substantially different from the existing eye glasses and is a definite improvement over the existing art as aforementioned.

SUMMARY

One object of the invention is to provide a dynamic attachment or dynamic frame to the bifocal glasses of the main frame wherein the attachment is a lens having the third power for intermediate vision sized and shaped for covering the middle one third of the bifocal lens, so that the lower border of the dynamic attachment will lie in front of the junction between the distance vision and near vision lens, which enables the user to clearly visualize all three zones of vision (near, distant and intermediate) at a time, while using the computer in the 'in use' position. This enables the optical center of the distant vision lens and optical centre of the intermediate vision lens to overlap with each other and fall on the visual axis which also coincides with the pupillary center of the eye at the primary head position thereby overcoming strain to the neck and other problems of aberrations and distortions. During use the dynamic frame is attached to the main frame at the press locks at the nose rest. After use the dynamic attachment will be moved back from the nose rest onto the side arms on each side and locked firmly at the press lock on the side arms of the main frame restoring the usual bifocal glasses effect. This is the 'not in use' position.

Yet another object of the invention is to provide a pair of press locks on either side at the side arms of the main frame comprising of a plate like projection of the frame material having a bulge of 0.5 mm size at its terminal edge on the surface that faces the dynamic frame. This bulge grips a part of the terminal rim of the dynamic frame while locking. When the user wants to use the computer, the dynamic frame will be released from the press locks on either side provided at the side arms and the mobile frames will be brought to the front and locked at the nose rest similarly with another set of similar press locks provided on either side of the nose rest.

The other objectives of the invention is to include anti-reflection coatings, absorptive coatings and filters that can be incorporated onto the lenses in combination with white lenses or photochromatic lenses to enhance the utility for computer purpose. These vision lenses could either be set in rims or could be rimless. The invention is sure to eliminate the difficulties faced by the computer users over 40 years of age (i.e.,) presbyopes and it will be helpful to overcome a sizeable portion of computer induced vision syndrome (CVS) of all age groups.

Summarizing the advantages of the invention, dynamic multifocal spectacle frames
1) It is easy to manufacture the lenses (Unlike trifocal and progressive lenses).
2) It is easy to grind and fix the lenses on two separate frames.
3) It is easy for the computer user to see the monitor clearly.
4) It shall be economical when compared to any other trifocal design of lenses.

5) Long hours of computer usage is made possible without any strain on the eyes, neck and back bone (whereas it is unavoidable in other models of trifocal glasses) as the user of dynamic trifocals need not change his head position to see the computer monitor.
6) Dynamic multifocal spectacle frame fitted with lenses will prevent dust and insects entering the eye from the sides when the dynamic frame is left attached to the side arms.

BRIEF DESCRIPTION OF THE DRAWINGS

For a more complete understanding of the present invention and the advantages thereof, reference is now made to the following description taken in conjunction with the accompanying Drawings in which:

FIG: 1 is the perspective view showing the embodiments of dynamic multifocal spectacle frame depicting the front view of the 'in use' position.

Figure 1:
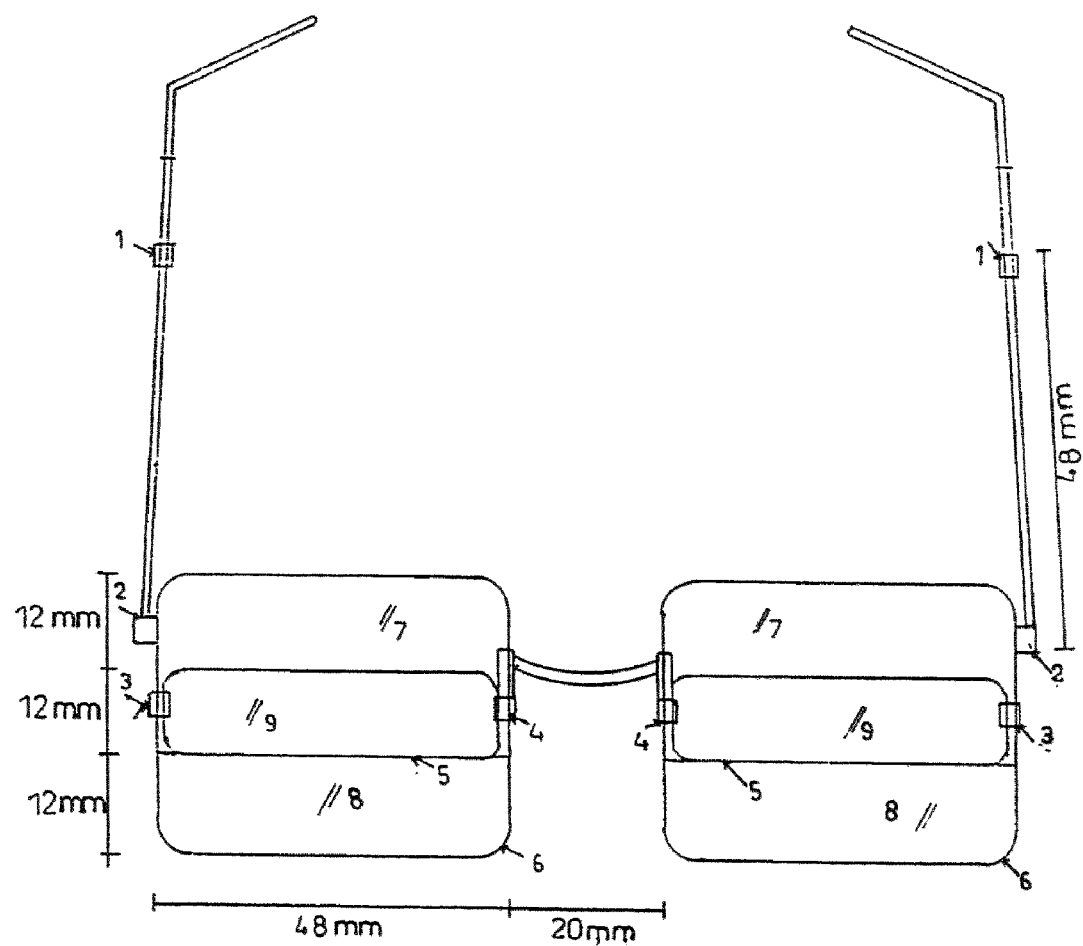

FIG: 2 is the perspective view showing the embodiments of the dynamic multifocal spectacle frame depicting the side view of the 'not in use' position.

FIG: 3 is the perspective view showing the front view of the dynamic multifocal spectacle frame at the 'not in use' position.

FIG: 4 is the perspective view of the press lock employed in the dynamic multifocal spectacle frame as an embodiment for locking the mobile frame.

The numerical markings in the drawings indicate the following embodiments.
1) A pair of press locks at the side arms of the main frame.
2) A pair of hinges for the main frame
3) A pair of hinges for the dynamic frame
4) A pair of press locks at the nose rest
5) A pair of dynamic frames
6) A pair of main frames
7) A pair of distant vision power eye lens
8) A pair of near vision power eye lens
9) A pair of intermediate vision power eye lens
10) Bulge of the lock
11) Plate like projection of the lock

DETAILED DESCRIPTION

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

The structural details of the dynamic multifocal spectacle frame with its embodiments and its functioning are described hereunder with reference to the drawings.

FIG. 1 schematically shows the front view of the dynamic multifocal spectacle frame with the necessary eye lenses. This is the 'in use' view of the dynamic multifocal spectacle frame. This is a computer eye glass with trifocal powers.

In FIG. 1 the main frame is represented by 6. While the present embodiment is described with respect to glasses with rims, rimless glasses or glasses having a rim only on the top portion of the lenses may also be used. Additionally, frames of different shapes such as round, oval, square, and modem octagonal designs may be used. This frame contains two types of lenses. Upper two thirds of frame 6 contains distant vision power eye lens 7 and the lower one third of the frame 6 contains near vision power eye lens 8. These distant vision lenses 7 in both eyes could be of different powers or same powers depending on the need of each particular wearer. The near vision power is an addition of '+' power to the distant vision power. This near vision power addition is usually bilaterally symmetrical and is usually related to the age and occupation of the wearer. FIG. 1 shows frame 5, which is a mobile frame now attached to the nose rest with the help of press locks 4 which will be described later. This frame 5 contains the intermediate vision power lens 9 the power of which is half of the near vision power addition. This intermediate vision lens is sized and shaped for covering the middle one third of the bifocal lens so that the lower border of the dynamic frame will lie in front of the junction between the distant vision and near vision lens. These powers are represented by "Diopters" in the conventional ophthalmic practice.

Figure 3:
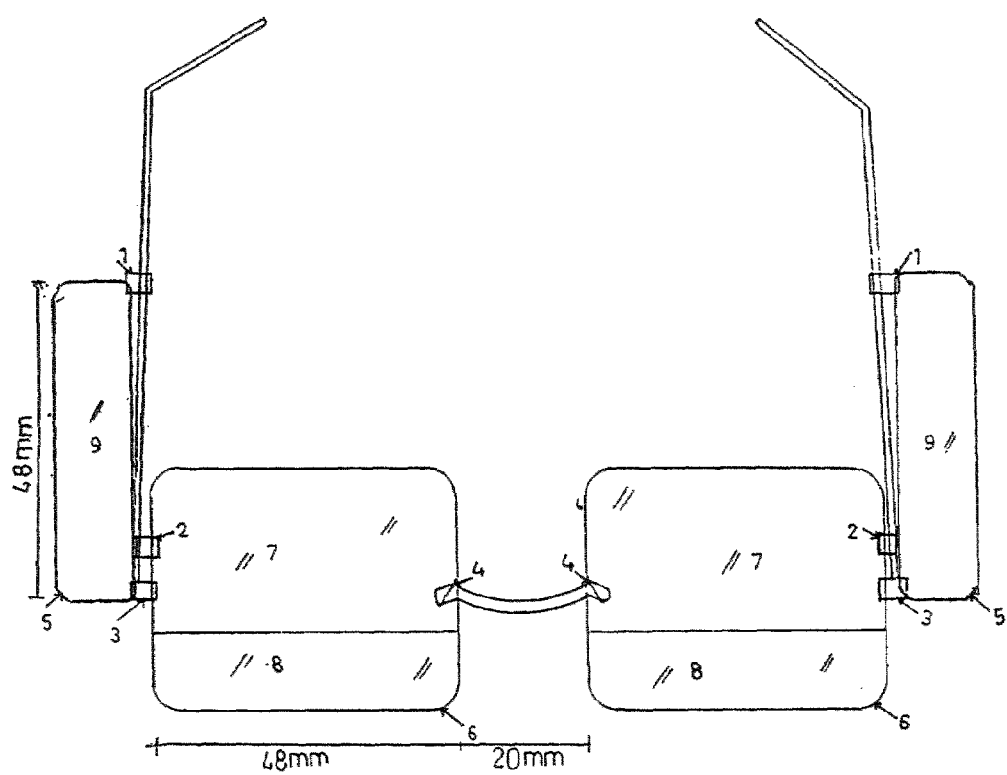

For example, if a 50 year old person using this computer eye glasses has a refractive error of +1.00, the distant vision power is +1.00 Diopter which will be fitted at the upper two thirds of the frame 6. This is lens 7. The near vision power addition that is required will be +2.00 Diopters for a person who is fifty years old. So the power of the near vision lens is [+2.00 Diopters]+[+1.00 diopter] which is equal to +3.00 Diopters. This +3.00 Diopter lens will be fitted at the lower one third of the frame 6. This is lens 8.These two lenses namely distant vision power lens 7 and near vision power lens 8 are usually fused with each other. The junction of these two lenses will be seen as a line of demarcation between these two lenses as shown in FIG. 3. In FIG. 1, the frame 5 contains the intermediate vision power lens, the power of which is half of the near vision power addition. So, the power of the intermediate vision lens is +2.00 Diopter divided by 2 which is equal to +1.00 Diopter. This is lens 9.

Lens 7 is distant vision power lens meant for viewing distant objects away from the monitor. Lens 8 is near vision power lens meant for viewing the keyboard and the papers on the table. Lens 9 is intermediate vision power lens which along with the lower half of lens 7 is meant for viewing the computer monitor.

The following simple definitions of common ophthalmic terminologies will provide better understanding to a person having ordinary skill in the art. The visual axis is an imaginary central line through which a person sees an object. The point on the lens through which the visual axis passes by is called the optical center of the lens. The pupillary center of the eye is the center point of the pupillary aperture of the eye through which the visual axis passes. Primary head position is the normal straight head position a person adopts while viewing an object straight in front of him. In this invention the optical centers of the distant vision lens and the intermediate vision lens are made to overlap with each other and lie on the visual axis coinciding with the pupillary center of the eye in the primary head position. In other words a person can look through both distant vision lens 7 and intermediate vision lens 9 without strain and effort. This arrangement totally avoids problems of distortions and aberrations. This is the major advantage and a definite improvement over any other prior art.

The dimensions may vary from frame to frame according to the head size of the user. For all practical purposes the recommended height of each of the lenses must not be less then 11 mm. In our dynamic multifocal spectacle frame, there is provision for 12 mm height for each of the lenses 7, 8 & 9 as shown in the FIG. 1 i.e. 'in use' position. To accommodate these heights of lenses it is desirable that the main frame 6 is of 36 mm height or more. The desirable width is 48 mm or more.

A pair of press locks 1 at the side arms of the main frame are located at a distance of 46 mm from the usual hinge 3. While press locks are describe with respect to the described embodiment, other types of locking mechanisms such as latches, snaps, etc. may be used to lock the lenses into place. A pair of press locks 4 is located at the central part of the nasal rim of the frame 6 on either side of the nose rest. Press lock 1 is helpful for the frame 5 to get locked to the side arms of frame 6 so that it is not a disturbance to the user when 'not in use'. At the same time while 'in use' the press lock 4 at the nose rest locks the mobile frame in position in order to avoid lying loose and swinging across while the wearer is using the frame.

Figure 2:
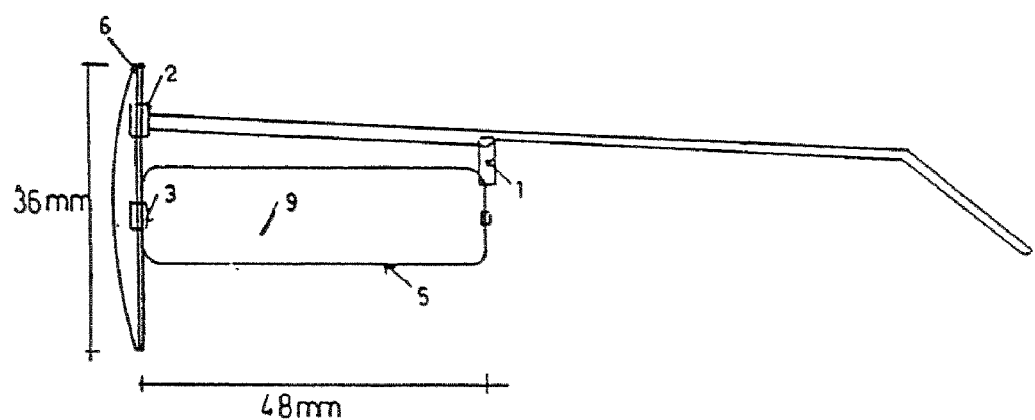

FIG. 2 schematically represents the side view or lateral view of the dynamic multifocal spectacle frame with the intermediate power lenses 9 fitted therein. In the side view, lens 9, the intermediate power lens is shown with the frame 5 and how it is attached with the side arm of the main frame with the help of press lock 1. The side view also shows the side view of the frame 6. The side lock 1 is holding the mobile frame 5 in position. This view depicts the appearance of the dynamic multifocal spectacle frame as it appears when 'not in use'.

Figure 4:
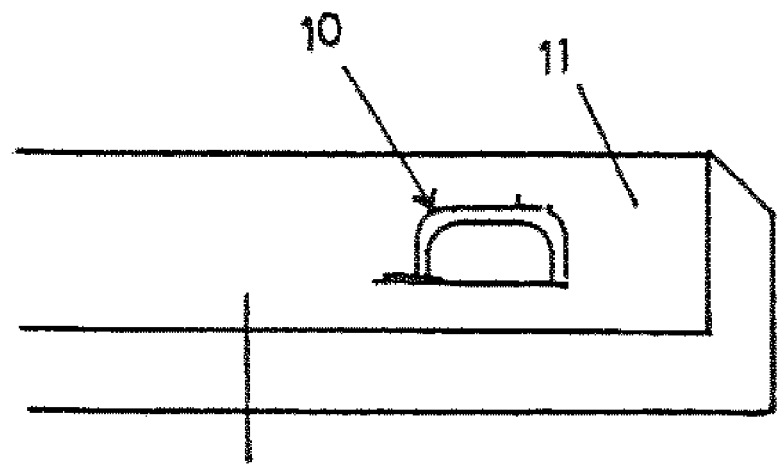

FIG. 3 schematically shows the front top view of the dynamic multifocal spectacle frame while 'not in use'. In this view it is appreciable that 7, the distant vision power lens is occupying the upper two thirds of the main frame 6. At this position this functions as a conventional bifocal eye glasses. Since the mobile frame 5 is kept well away from the visual fields, it will not obscure the view during driving, climbing stairs etc., FIG. 4 Schematically depicts the press lock. The two pairs of press locks 1 and 4 are all structurally identical embodiments. Both the pairs of press locks at the side arms and the nose rest 1 and 4 respectively comprise of a plate like projection 11 made of the frame material having a bulge 10 of 0.5 mm size at its terminal edge on the surface that faces the dynamic frame. This bulge grips a part of the terminal rim of the dynamic frame 5 while locking.

The configuration described herein describes a pair of glasses, comprising a pair of bifocal lenses, said lenses including a first portion of the bifocal lens for viewing objects at a first distance and a second portion for viewing objects at a second distance, wherein the second distance is closer than the first distance. A second pair of lenses for viewing objects at a third distance connected with the pair of bifocal lenses to move between a first position covering a lower portion of the first portion of the pair of bifocal lenses and a second position not covering any portion of the pair of bifocal lenses, the third distance being between the first distance and the second distance. The second pair of lenses is in the first position a user is provided a first zone of vision through the first portion of the pair of bifocal lens not covered by the second pair of lenses for viewing objects at the first distance, a second zone of vision through the second pair of lenses covering the lower portion of the first portion of the pair of bifocal lenses for viewing objects at the third distance, and a third zone of vision through the second portion of the pair of bifocal lenses for viewing objects at the second distance.

The material that is to be used for manufacturing the eye glass frames could be metals or alloys or plastic. The common materials used for making eye glass frames are, copper, gunmetal, steel, carbon, polyamide carbon, gold, platinum, titanium, monel, beryllium, ticral, flexion, aluminum or any other synthetic material like zylonite, propionate, nylon, etc. Since the frame 5 is an additional fitting to the regular eye glass frame, it may be feared that the overall weight of the eye glasses may be increased. To reduce the weight, the following concepts may be incorporated by making the frames with carbon and polycarbon materials and by using high index glasses in 7, 8 & 9. Further it is desirable that the rimless designs of this dynamic multifocal spectacle frame is another way to minimize the overall weight of the frames. By reducing the weight of the frame we can make the wearer feel comfortable while using the frame.

Since this invention is an outcome of the need felt by the thousands of computer users especially those above 40 years of age, this is sure to provide comfort to the user. Since the computer vision syndrome is the major eye problem in the present and in the future, this invention of dynamic multifocal spectacle frame is sure to alleviate the problems and difficulties encountered by the computer user. This is an improvement over any other present art by providing the three zones of vision at a time which is very essential for the computer user.

In addition to the above utilities the dynamic multifocal spectacle frames also could be useful for different coatings over the lenses 7, 8 & 9. The availability of two lenses overlapping with each other in front of the eyes together functioning as one unit multiplies protection to the eyes if different combinations of absorptive, reflective and filter coatings are incorporated onto the different power lenses. This again is very helpful to overcome the Computer Vision Syndrome of any age group. These lenses could either be white or photochromatic.

It will be appreciated by those skilled in the art having the benefit of this disclosure that this invention provides a dynamic multifocal spectacle frame. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A pair of glasses, comprising:
   a pair of bifocal lenses, said lenses including a first portion of the bifocal lens for viewing objects at a first distance and a second portion for viewing objects at a second distance, wherein the second distance is closer than the first distance;
   a second pair of lenses for viewing objects at a third distance connected with the pair of bifocal lenses to move between a first position covering a lower portion of the first portion of the pair of bifocal lenses and a second position not covering any portion of the pair of bifocal lenses, the third distance being between the first distance and the second distance; and
   wherein when the second pair of lenses is in the first position a user is provided a first zone of vision through the first portion of the pair of bifocal lens not covered by the second pair of lenses for viewing objects at the first distance, a second zone of vision through the second pair of lenses covering the lower portion of the first portion of the pair of bifocal lenses for viewing objects at the third distance, and a third zone of vision through the second portion of the pair of bifocal lenses for viewing objects at the second distance.

2. The pair of glasses of claim 1, further comprising:
a first locking mechanism for locking the second pair of lenses in the first position; and
a second locking mechanism for locking the second pair of lenses in the second position.

3. The pair of glasses of claim 2, further comprising a frame for holding the pair of bifocal lenses.

4. The pair of glasses of claim 3, wherein the first locking mechanism is located on a nose rest of the frame and the second locking mechanism is located on side arms of the frame.

5. The pair of glasses of claim 3, wherein the first and the second locking mechanism further comprise:
a plate connected to the frame; and
a projection defined on the plate for gripping a portion associated with the pair of second lenses.

6. The pair of glasses of claim 5, wherein the portion associated with the pair of second lenses comprises a frame of the pair of second lenses.

7. The pair of glasses of claim 1, wherein when the second pair of lenses is in the first position a first optical center of the first portion of the pair of bifocal lenses and a second optical center of the second pair of lenses overlap each other and lie on a visual axis coinciding with a pupillary center of an eye of the user in a primary head position.

8. The pair of glasses of claim 1, wherein the first zone of vision includes a top third of the pair of bifocal lenses, the second zone of vision includes a middle third of the pair of bifocal lenses covered by the second pair of lenses and the third zone of vision includes a lower third of the pair of bifocal lenses.

9. A pair of glasses, comprising
a pair of bifocal lenses, said lenses including a first portion of the bifocal lens for viewing objects at a first distance and a second portion for viewing objects at a second distance, wherein the second distance is closer than the first distance;
a second pair of lenses for viewing objects at a third distance connected with the pair of bifocal lenses to move between a first position covering a lower portion of the first portion of the pair of bifocal lenses and a second position not covering any portion of the pair of bifocal lenses, the third distance being between the first distance and the second distance; and
wherein when the second pair of lenses is in the first position a first optical center of the first portion of the pair of bifocal lenses and a second optical center of the second pair of lenses overlap each other and lie on a visual axis coinciding with a pupillary center of an eye of the user in a primary head position.

10. The pair of glasses of claim 9, wherein when the second pair of lenses is in the first position a user is provided a first zone of vision through the first portion of the pair of bifocal lens not covered by the second pair of lenses for viewing objects at the first distance, a second zone of vision through the second pair of lenses covering the lower portion of the first portion of the pair of bifocal lenses for viewing objects at the third distance, and a third zone of vision through the second portion of the pair of bifocal lenses for viewing objects at the second distance.

11. The pair of glasses of claim 9, wherein the first zone of vision includes a top third of the pair of bifocal lenses, the second zone of vision includes a middle third of the pair of bifocal lenses covered by the second pair of lenses and the third zone of vision includes a lower third of the pair of bifocal lenses.

12. The pair of glasses of claim 9, further comprising:
a first locking mechanism for locking the second pair of lenses in the first position; and
a second locking mechanism for locking the second pair of lenses in the second position.

13. The pair of glasses of claim 12, wherein the first locking mechanism is located on a nose rest of a frame of said pair of bifocal lenses and the second locking mechanism is located on side arms of the frame.

14. The pair of glasses of claim 12, wherein the first and the second locking mechanism further comprise:
a plate connected to a frame of said pair of bifocal lenses; and
a projection defined on the plate for gripping a portion associated with the pair of second lenses.

15. The pair of glasses of claim 14, wherein the portion associated with the pair of second lenses comprises a frame of the pair of second lenses.

16. The pair of glasses of claim 9, further comprising:
a frame for holding the pair of bifocal lenses; and
a second frame for holding the second pair of lenses.

17. A pair of glasses, comprising:
a pair of bifocal lenses, said lenses including a first portion of the bifocal lens for viewing objects at a first distance and a second portion for viewing objects at a second distance, wherein the second distance is closer than the first distance;
a frame for holding the pair of bifocal lenses;
a second pair of lenses for viewing objects at a third distance connected to the frame to move between a first position covering a lower portion of the first portion of the pair of bifocal lenses and a second position not covering any portion of the pair of bifocal lenses, the third distance being between the first distance and the second distance;
a second frame for holding the second pair of lenses;
a first locking mechanism for locking the second pair of lenses in the first position; and
a second locking mechanism for locking the second pair of lenses in the second position;
wherein when the second pair of lenses is in the first position a user is provided a first zone of vision through the first portion of the pair of bifocal lens not covered by the second pair of lenses for viewing objects at the first distance, a second zone of vision through the second pair of lenses covering the lower portion of the first portion of the pair of bifocal lenses for viewing objects at the third distance, and a third zone of vision through the second portion of the pair of bifocal lenses for viewing objects at the second distance; and
further wherein when the second pair of lenses is in the first position a first optical center of the first portion of the pair of bifocal lenses and a second optical center of the second pair of lenses overlap each other and lie on a visual axis coinciding with a pupillary center of an eye of the user in a primary head position.

18. The pair of glasses of claim 17, wherein the first locking mechanism is located on a nose rest of the frame and the second locking mechanism is located on side arms of the frame.

19. The pair of glasses of claim 17, wherein the first and the second locking mechanism further comprise:
- a plate connected to the frame; and
- a projection defined on the plate for gripping the second frame.

20. The pair of glasses of claim 17, wherein the first zone of vision includes a top third of the pair of bifocal lenses, the second zone of vision includes a middle third of the pair of bifocal lenses covered by the second pair of lenses and the third zone of vision includes a lower third of the pair of bifocal lenses.

* * * * *